United States Patent [19]

Gozani et al.

[11] Patent Number: 5,006,299
[45] Date of Patent: Apr. 9, 1991

[54] EXPLOSIVE DETECTION SYSTEM

[75] Inventors: Tsahi Gozani, Palo Alto; Patrick M. Shea, Sunnyvale, both of Calif.

[73] Assignee: Science Applications International Corporation, San Diego, Calif.

[21] Appl. No.: 321,511

[22] Filed: Mar. 9, 1989

Related U.S. Application Data

[63] Continuation of Ser. No. 53,950, May 26, 1987, abandoned.

[51] Int. Cl.$^5$ .............................................. G21G 1/06
[52] U.S. Cl. ................................................... 376/159
[58] Field of Search ................................ 376/159, 257

[56] References Cited

U.S. PATENT DOCUMENTS

| | | | |
|---|---|---|---|
| 3,018,374 | 1/1962 | Pritchett | 376/159 |
| 3,124,679 | 3/1964 | Tittman et al. | 326/159 |
| 3,146,349 | 8/1964 | Jordan | 376/159 |
| 3,237,765 | 3/1966 | Gaudin et al. | 376/159 |
| 3,728,544 | 4/1973 | Untermyer | 376/159 |
| 3,767,919 | 10/1973 | Michaelis | 376/159 |
| 3,786,256 | 1/1974 | Untermyer | 376/159 |
| 3,808,444 | 4/1974 | Schneeberger et al. | |
| 3,832,545 | 8/1974 | Bartko | |
| 4,229,654 | 10/1980 | Arya et al. | |
| 4,251,726 | 2/1981 | Alvarez | 376/157 |
| 4,320,298 | 3/1982 | Buford, Jr. et al. | |
| 4,361,534 | 11/1982 | Borsaru et al. | |
| 4,756,866 | 7/1988 | Alvarez | 376/157 |
| 4,851,687 | 7/1989 | Ettinger et al. | 376/159 |

FOREIGN PATENT DOCUMENTS

| | | | |
|---|---|---|---|
| 1236831 | 3/1967 | Fed. Rep. of Germany | 376/159 |
| 2064504 | 7/1972 | Fed. Rep. of Germany | 376/159 |

Primary Examiner—Harvey E. Behrend
Attorney, Agent, or Firm—Ellsworth R. Roston; Charles H. Schwartz

[57] ABSTRACT

A system for detecting the presence of explosives contained in an object under observation, including a cavity structure for receiving the object and a radiation source for producing thermal neutrons directed to the object under observation. Gamma rays are produced to represent the presence of explosives and as an example the concentration of nitrogen contained in the object. Inorganic scintillators are located within the cavity structure to detect the gamma rays and produce an output signal representative of the presence and concentration of the nitrogen and/or other elements contained in the object. The inorganic scintillators are formed as a ring around the cavity structure to detect the nitrogen and/or other elements within at least one particular plane passing through the object. The object under observation is moved through the cavity structure to detect the nitrogen in successive planes to build up a three dimensional profile of explosives concentration.

46 Claims, 4 Drawing Sheets

EXPLOSIVE DETECTION SYSTEM

This is a continuation of application Ser. No. 053,950 filed May 26, 1987, now abandoned.

BACKGROUND OF THE INVENTION

1. Field of the Invention

The present invention relates to an explosive detection system. Specifically, the present invention relates to a detection system using thermal neutrons in combination with a detector formed from an inorganic scintillator such as a scintillator made of sodium iodide to provide for a more efficient detection of explosives. A specific detection system may be provided using a ring of detectors to detect the presence of explosive within a particular plane of an object under inspection and with a continuous movement of the object providing for a three dimensional profile of the explosive.

2. Description of the Prior Art

A great need exists for the scanning of luggage, baggage and other parcels for the detection of any explosive material contained or concealed within their confines. For example, a large number close to two million (2,000,000) pieces of luggage are checked and/or carried onto aircraft daily by close to seven hundred and fifty thousand (750,000) passengers within six hundred (600) airports extending across the country. Many more packages move through the mails or are shipped to sensitive buildings. There is a possibility, albeit small, that any one piece of luggage or parcel may contain explosive material. It is, therefore, desirable to protect the public by providing detection systems to scan the luggage and parcels to detect the presence of any explosive material.

It thereby follows that any system of checking luggage or parcels must have a very high probability of detection in order to be effective. Because of the large number of parcels processed, a high throughput is necessary for practicality. In addition, because of the large number of scanned items, any detection system is bound to occasionally give a false alarm. The probability of these false alarms must be minimized in order to provide for an effective explosive detection system. This is true since when an alarm occurs it is not known, at that time, whether it is true or false. This means that each time an alarm occurs, a passenger or parcel must be detained for further investigation. If false alarms are significantly high the nuisance level and the delays could be unacceptable to the public. It is, therefore, important that any explosive detection system must have a very high probability of detection and a high throughput rate, and yet, at the same time, have a very low probability of false alarms. These conflicting criteria have hampered efforts in the past to build a reliable and usable system.

In general, prior art systems have not met the desired characteristics of having a high probability of detection with a low probability of false alarms at acceptable throughput rates.

As an example, one such prior art system is shown in U.S. Pat. No. 3,832,545. This patent provides for a system for the detection of nitrogen, which is generally present in the explosive materials to be detected. The object under observation is positioned within a cavity structure and the object is bombarded by thermal neutrons. The thermal neutrons interact with any nitrogen contained in the object to induce the emission of gamma rays at an energy level characteristic of the nitrogen element.

The emitted gamma rays are then detected by two parallel planar arrays of gamma ray detectors. U.S. Pat. No. 3,832,545 specifically provides for the use of liquid or plastic type organic scintillator detectors having an end surface for viewing a portion of the article being inspected and with the length of the organic scintillator being substantially greater than the effective diameter of the end surface. As described in this prior art patent, the array of organic scintillators provides for a crude two dimensional profile of the nitrogen content within the object being inspected. The two dimensional concentration profile of the nitrogen is then used to provide for a detection of an explosive. This type of prior art system has a number of deficiencies, including both a low gamma ray intensity and spatial resolution of the detection of the concentration of the nitrogen contained in the object under inspection, and the insensitivity of the system to detect explosive devices which are deliberately positioned within the object under inspection so as to defy detection. Because of the use of liquid or plastic type scintillators, long times are required to make a decision about any object. The system described in the prior art patent is also slow and cumbersome in operation which is a further limitation to its usefulness.

Other types of prior art explosive detection systems depend upon the prior seeding of explosive materials with a tracer material, such as a radioactive tracer. Although this type of system could be very useful if all explosive material were manufactured with such tracer material, because of the large amount of explosive material which has already been manufactured and because of the difficulty of controlling the manufacture of all explosive material so as to contain such tracer material, this type of system is not practical. A usable system must be able to detect the presence of explosive material of a conventional type and of an unconventional type, whether disposed within an object either in its original manufactured form, or if deployed within the object so as to attempt to confuse or evade the detection system. The prior art systems have not met these various criteria and cannot produce the desired high probability of detection with the relatively low production of false alarms.

An acceptable response to the explosive threat to aviation, mails, or shipping requires detection techniques that are highly sensitive, specific, rapid and non-intrusive. The efficient detection of nitrogen, at this point, offers the best overall solution. It is, therefore, important that this detection of nitrogen be provided to give the maximum information of the physical parameters of the explosive, such as density and spatial distribution. The use of nuclear based techniques which subject the luggage or parcels to thermal neutrons can be the basis of a system to produce the desired results, but this system cannot be based on the prior art techniques. It is important that the intensity, energy and spatial distribution of the detected radiations from the object under observation must be provided in such a way so as to help to determine the presence or absense of explosives and this has not yet been accomplished.

In addition to high detection sensitivity and low false alarm the detection of the explosive should be independent of the specific configuration and must be non-intrusive in order to protect privacy. The detection equipment, of course, must be non-hazardous to the contents of the checked items and to the operating personnel and environment. Other more general criteria are that the system must be reliable, easily maintained and operable by relatively unskilled personnel and that the cost must be low enough so as to be non-burdensome to airlines and airports. Finally, it is desirable, when all other requirements achieved that the size of the system be relatively small so that the system may be useful in a wide variety of environments.

In addition to the nuclear based systems described above, non-nuclear systems have also been investigated. These systems have achieved relatively high efficiencies of detection, but generally have relatively high false alarm rates and have long screening times. These type of non-nuclear systems, therefore, by themselves cannot achieve the desired results. It is possible to combine a non-nuclear system with a nuclear system, but the present invention is directed to specific improvements in the nuclear based type of system.

In order to develop a proper explosive detection system, an understanding is required of the properties of the various explosives relevant to the specific techniques to be used. Although there are a large number of explosive types, a general classification into six major groups with minor variations, has been proposed. The proposed classification scheme includes the following types of explosives: (1) nitroglycerine based dynamites, (2) ammonium nitrate based dynamites, (3) military explosives, (4) homemade explosives, (5) low order powders, and (6) special purpose explosives.

Nitroglycerine based dynamites are the most common form of explosives. The basic composition includes equal amounts of nitroglycerine and ethylene glycol dinitrate, plus a desensitizing absorber in the form of cellulose in either sodium or ammonium nitrate.

The ammonium nitrate based dynamites have been replacing nitroglycerine based dynamites in popularity. These types of dynamites are commonly referred to as slurries or water gels. The two general types of ammonium based dynamites are the cap-sensitive and the cap-insensitive types. The former consists of aluminum, ammonium nitrate, ethylene glycol and water while the latter contains wax or fuel oil and water.

Military explosives are formed of Composition-4 (C-4), TNT and picric acid. C-4 is composed of cyclotrimethylene trinitramine (RDX) and a plasticizer.

Homemade explosives are diverse and are limited only by the creativity of the perpetrator. Ammonium nitrate (fertilizer) and fuel oil are the most common and available constituents.

Low order powders (black and smokeless) have typically been assembled in pipe bomb configurations and have been used extensively in that form. Black powder contains potassium nitrate, carbon and sulfur. Smokeless powder is primarily pure nitrocellulose or a mixture of nitrocellulose and nitroglyerine.

Special purpose explosives include detonating cords, blasting caps and primers. The explosive entities in the special purpose explosives are PETN, lead azide, lead styphanate, mercury fulminate and blasting gel.

In general, all of these explosives contain a relatively high amount of nitrogen ranging from nine to thirty five percent by weight. The nominal density of these explosives is typically 1.6 gm/cm$^3$ and with ranges between 1.25 to 2 gm/cm$^3$ or more. These physical properties demonstrate that the most unique signature of explosives is the high concentration and density of the nitrogen content. There are other physical factors that identify explosives, but these other factors do not form part of the present invention. However, one factor which is important is that most explosives have a minimum progagation thickness or diameter in order to be effective. The minimum propagation thickness entails a sizable contiguous body of explosives in the other two dimensions. This information is useful to the detection of explosives without making a specific assumption of the actual shape of the explosive.

In can be seen, therefore, that a nuclear detection technique can provide for the detection of the nitrogen content to reliably indicate the presence of a large nitrogen content. However, the frequent occurrence of nitrogen in non-explosive materials limits the level of detection sensitivity and merely detecting the presence or absence of nitrogen alone is not sufficient. Therefore, additional information is required beyond simply sensing the presence of the nitrogen. The present invention provides for this additional information using specific structures and a specific detection configuration to provide for a greater reliability in the detection of explosives.

SUMMARY OF THE PRESENT INVENTION

The basis for the explosive detection system of the present invention is the use of neutrons from a radioisotope or an electronic neutron generator which neutrons are then slowed down to create a cloud of low energy thermal neutrons within a cavity. The luggage or other parcels pass through the cavity and the thermal neutrons react with the variety of nuclei in the luggage or parcels and produce characteristic high energy gamma rays which may then be detected by external detectors. The detector processing electronics then converts the detected signals into pulses suitable for computer processing.

The present invention relates to the specific arrangement and type of the detectors relative to the use of thermal neutrons as a source to provide the proper information. The information may then be converted by computer processing to indicate the possible presence of an explosive threat. At a minimum, if there is a high enough count rate indicating the presence of a great deal of nitrogen, the system of the present invention can easily detect the presence of an explosive. The system of the present invention can also detect explosives provided in more unconventional configurations and at the same time reduce the number of false alarms to a relatively low level. The prior art detector systems in general provide for the gross detection, but cannot provide for the more sensitive detection of the unconventional configurations while, at the same time, providing for a relatively low level of false alarms.

The explosive detection system of the present invention includes the use of efficient inorganic scintillators capable of resolving closely spaced high energy gamma ray lines. Specifically, sodium iodide scintillators are used to provide for detection, but it is to be appreciated that other inorganic scintillators such as cesium iodide, bismuth germanate and barium floride scintillators may also be used. In addition, inorganic solid state detectors such as lithium-drifted germanium, high purity germanium or mercuric iodide may be used.

The inorganic scintillators of the present invention are arranged to form at least one ring of detectors so as to provide for a detection of a plurality of slices or parallel successive planes of the object under inspection as the object is moved continuously through the ring of detectors. In a specific embodiment of the invention, this ring is broken into sets of C-rings; and in order to provide for a better three dimensional representation, two spaced sets of C-ring detectors may be used with the open ends of the C-rings facing each other so as to provide for a detection completely around the object and with the plurality of successive planes building up a three dimensional profile of the object under inspection.

The system of the present invention is capable of scanning a continuous flow of luggage and parcels. In addition, the operation of the system may be fully automatic so that the system does not depend on operator experience or interpretation and thereby provides for an automatic detection of explosives.

BRIEF DESCRIPTION OF THE DRAWINGS

A clearer understanding of the present invention will be seen with reference to the following description and drawings wherein:

FIG. 5(a), (b) and (c) illustrate typical spatial profiles of nitrogen concentration for explosive and non-explosive materials.

DESCRIPTION OF THE PREFERRED EMBODIMENT

Figure 1:
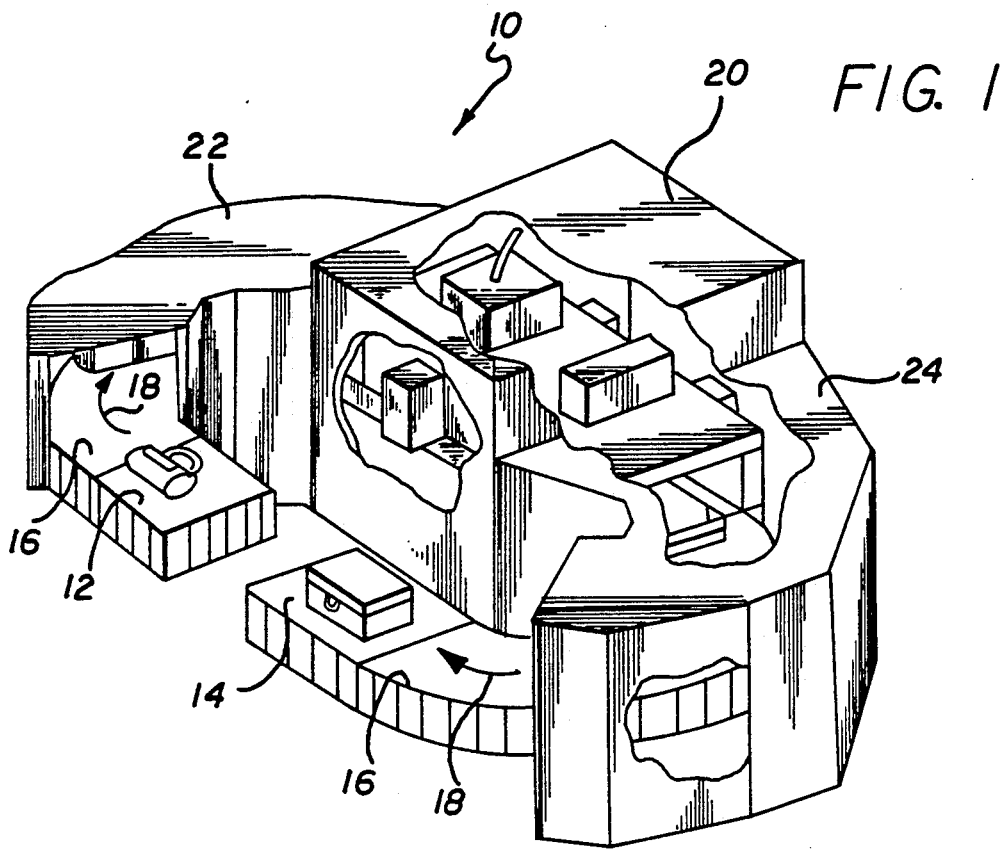
FIG. 1 illustrates a perspective view of a luggage and parcel inspection system.

As shown in FIG. 1, an explosive detection system 10 includes a loading station 12 (which may consist of a scale to weigh the luggage) and an unloading station 14 (which may consist of a diverter to separate the alarmed lugguge from the rest). The loading station leads to a continuous conveyer belt 16 which extends from the loading station 12 to the loading station 16 and has a continuous motion as indicated by the arrows 18. A central shield structure 20 encloses the explosive detection system and with two external wing portions 22 and 24 extending from the central structure 20 to enclose the conveyer belt 16 leading from and to the loading and unloading stations 12 and 14.

Figure 2:
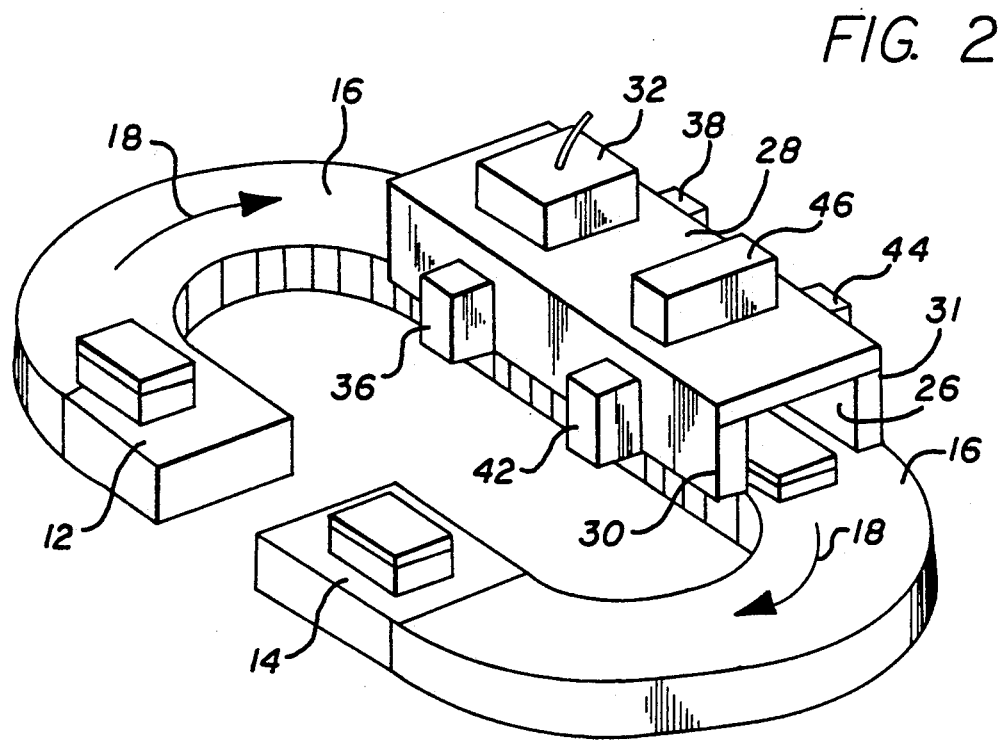
FIG. 2 illustrates the system of FIG. 1 with a shield portion of the system removed.

As can be seen in FIG. 2, wherein the shields 20, 22 and 24 are removed, the explosive detection system is positioned over a central portion of the conveyer belt 16. Specifically, the explosive detection system includes a cavity structure 26 through which the conveyer belt 16 passes. As shown in FIGS. 1 and 2, various articles of luggage and parcels may be positioned on the loading station 12 and may then be carried through the cavity 26 to the unloading station 14 by the conveyer belt 16.

Figure 3:
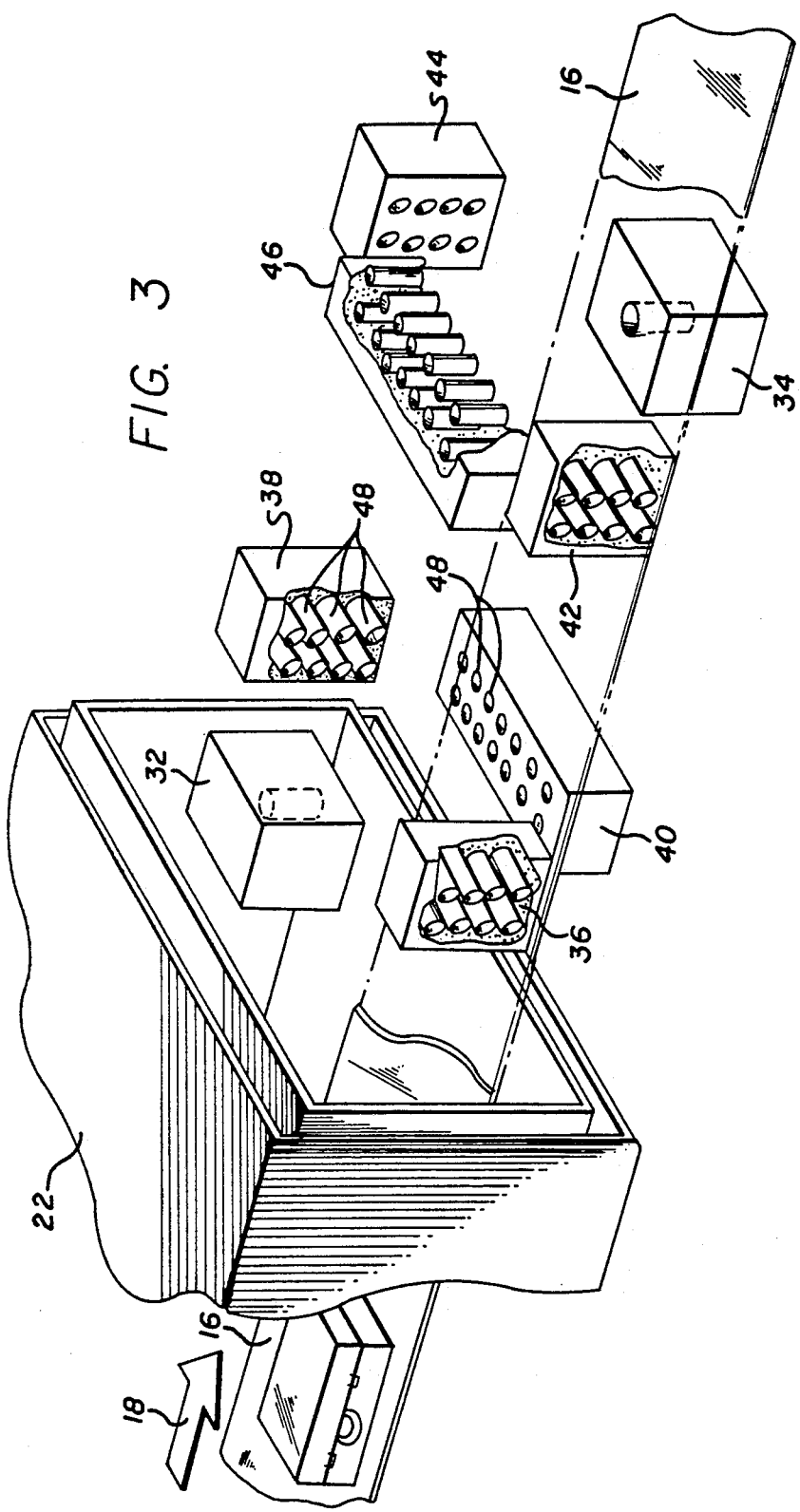
FIG. 3 illustrates a detailed view of a conveyer path for the system showing the positioning of a pair of thermal neutron sources and sets of inorganic scintillator detectors constituting the C-ring detector array.

The cavity 26 is formed by external wall members including a top wall 28, side walls 30 and 31 and a bottom wall (not shown) which is positioned below the conveyer belt 16. Extending through the wall members are thermal neutron sources, such as source 32, positioned at the top of the cavity and as shown in FIG. 3, neutron source 34 spaced from the neutron source 32 and positioned at the bottom of the cavity. Also as shown in FIGS. 2 and 3, detector structures are positioned to form two C-rings of detectors having their opened ends facing the neutron sources. This may be seen in FIG. 3 wherein the side detector structures 36 and 38 together with the bottom detector structure 40 are all associated with the neutron source 32. Similarly, side detector structures 42 and 44 together with the top detector structure 46 are all associated with the neutron source 34.

As shown in FIG. 3, the side detector structures are provided by two sets of four detectors located in each side detector structure 36 and 38. The bottom detector structure 40 includes two sets of seven detectors. The detectors associated with the neutron source 34 similarly include two sets of four detectors located in each side detector structure 42 and 44 and two sets of seven detectors located in the top detective structure 46. The detectors associated with the neutron source 32, therefore, form a C-ring of detectors having the opened portion of the C facing upward. In an opposite fashion the detectors associated with the neutron source 34 form a C-ring with the opened portion of the C facing downward. The combination of the two sets of C-ring detectors thereby provide for the detection of a complete ring around the object under inspection to produce a better three dimensional profile of the nitrogen distribution within any particular object passing through both sets of detectors.

It is to be appreciated that the invention is described with reference to the use of two C-ring detector structures and with each C-ring including two sets of parallel rows and columns of detectors. It should be appreciated that only a single C-ring structure may be used with only a single row and column of detectors. The use of the additional parallel sets of detectors improves the visualization of the profile of the concentration of nitrogen, but a simpler system could be used with a single C-ring and single rows and columns of detectors. It is also to be appreciated that more detectors could be used. A full ring of detectors could also be placed out of the plane of the source, around the cavity.

The actual structure of the neutron source and its environment, such as the structures 32 and 34, may be of any type. For example, the neutron source may be a radioisotope (such as 252Cf) or an electronic neutron source (such as (D,D) or (D,T) generators). By collisions, mostly with the nuclei of the selected materials surrounding the source the neutrons are slowed down to create a cloud of low energy thermal neutrons within the cavity. The low energy thermal neutrons specifically interact with the variety of nuclei in the luggage or parcel. The interaction of the low energy thermal neutrons produces characteristic high energy gamma rays which are detected by the external rows and columns forming the C-ring detectors.

Each detector in the rows and columns preferably are formed of inorganic scintillators. Specifically, all of the detectors, such as represented by a detector 48, may be formed of an inorganic scintillator material, such as sodium iodide (NaI). Other inorganic materials may be used and as an example, inorganic materials such as cesium iodide (CsI), bismuth germanate (BGO-$Bi_4 Ge_3 O_{12}$) or barium fluoride ($BaF_2$) also may be used to provide for the detector structure. In addition inorganic solid state detectors such as lithium-drifted germanium (Ge(Li)), high purity germanium (HPGe) or mercuric iodide ($HgI_2$) may be used. The particular details of a specific detector structure do not form a part of the present invention, but the specific use of an inorganic scintillator with good energy resolution and efficiency to detect gamma rays produced by thermal neutrons provides for a unique detection of nitrogen and/or other elements to form a part of the present invention.

Although inorganic scintillators have been used in the past with thermal neutrons, this use was not for the detection of nitrogen in explosives, but rather to provide for the detection of chlorine, iron, chromium, etc. as a background component and not specifically for the detection of the nitrogen component and spatial distribution of the explosive material. Other uses of inorganic scintillators have been in combination with fast neutron sources so as to detect nitrogen, but this different type of neutron source provides for a different type of detection.

The present invention contemplates the specific combination of a thermalized neutron source with an inorganic scintillator, such as a sodium iodide detector. This specific combination provides for the capability of resolving closely spaced high energy gamma ray lines and specifically for detecting the particular gamma ray lines representative of the nitrogen content of explosives. These particular high energy gamma rays lines occur at 10.8 MeV. The inorganic scintillator detector is used because it is a very efficient detector and because it provides acceptable features in a number of areas. These areas include level of total count rate, the shape of the detector, availability of detector, reliability and cost. It is to be appreciated that the inorganic scintillator may also be used to detect other elements representative of an explosive.

As indicated above, the currently preferred inorganic material is sodium iodide, but other inorganic materials may be used. For example, bismuth germanate has a higher effective atomic number because of the bismuth and a higher density than the sodium iodide. The efficiency of a bismuth germanate scintillator is, therefore, higher than that of sodium iodide. However, bismuth germanate scintillators are inferior to sodium iodide in energy resolution and the cost for a bismuth germanate scintillator is much higher than that for sodium iodide and it also has a background component that can interfere with the nitrogen signal. However, both of these inorganic structures are superior to the organic scintillators used in the prior art devices.

For example, on the basis of the mean free path of 10 MeV gamma rays, sodium iodide and bismuth germanate are roughly 6 and 11 times more efficient than organic scintillators. Moreover, in terms of depositing the gamma energy in the scintillators, sodium iodide and bismuth germanate are roughly 10 and 40 times respectively more efficient than organic scintillators. The energy resolution, which is the ability to separate two lines, given as the peak's width at half the peak's height, is around 200 to 300 KeV for sodium iodide and 400 to 500 KeV for bismuth germanate at high energies and with the range depending on the crystal size and quality.

The main advantage of the prior art organic scintillators, which may be plastic or liquid, is their very fast time response permitting exceedingly high count rates. Because of the very high count rates, a high background from other neutron reactions can be handled easily and thereby eliminate the need for sophisticated cavity design. Another advantage of the organic scintillators is their relatively low cost and ease of manufacture. Even with these advantages with the use of organic scintillators, the use of the inorganic scintillators of the present invention, and specifically in the particular C-ring configuration, provides for a higher resolution and thereby a more efficient detection of any explosive material. The organic scintillators are inefficient detectors for high energy gamma rays and their gamma spectroscopical qualities are poor. Organic scintillators thereby have poor energy resolution and make the separation between nitrogen and deleterious signals, such as occur with Cl, Fe, Cr or Ni, very difficult.

As can be seen in FIG. 3, any item to be scanned, such as a piece of luggage, passes through the cavity on the conveyor 16 and is subjected to the thermal neutrons produced by the thermal neutron source 32. At successive positions of the piece of luggage, the individual detectors 48, forming the row 40 and columns 36 and 38, provide for a cross sectional profile of any material containing nitrogen. The C-ring of detectors thereby provides for a two dimensional slice or plane of the nitrogen concentration and a three dimensional profile built up by the successive slices produced as the luggage moves through the C-ring of detectors.

The two dimensional plane provided by the detector structures 36, 38 and 40 has less resolution at the upper end since the C-ring is not complete. Although a detector structure could also be provided along the upper surface of the cavity such detector structure could interfere with the production of thermal neutrons by the source 32 of such neutrons. A more efficient way of completing the ring is to have a second C-shaped group of detector structures provided downstream of the first group so that the luggage moves from the first C-ring of detector structures to the second C-ring of detector structures, the open ends of the C-rings in the first and second sets being opposite to each other. The information from the two sets of C-rings of detector structures may be merged electronically in a computer to provide for a complete picture. As indicated above, this picture forms a three dimensional image of the container such as the luggage and its contents by building up the successive slices or planes of information.

Figure 4:
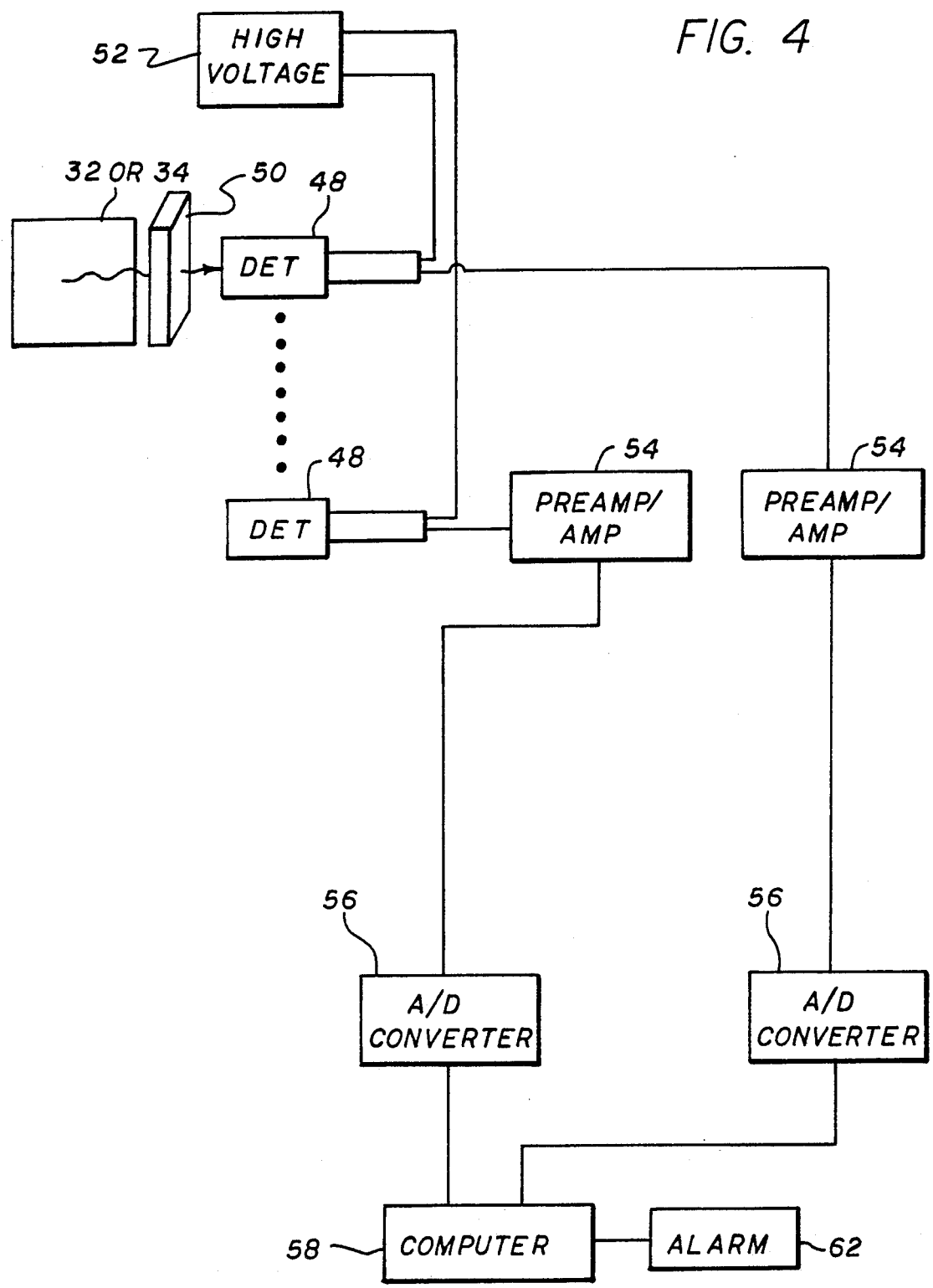
FIG. 4 illustrates a block diagram of the system showing the detection of particular gamma rays for detecting of explosive material and with waveforms (a), (b) and (c) representative of the signals at particular points in the system.
Figure 4A:
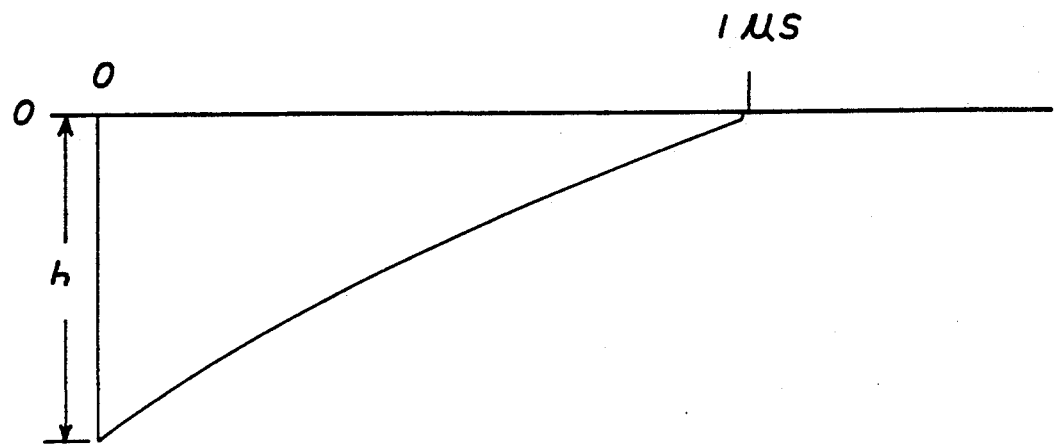
Figure 4B:
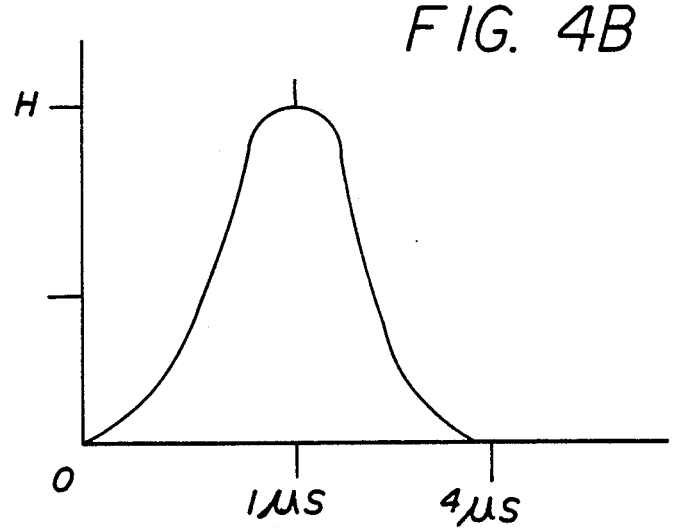
Figure 4C:
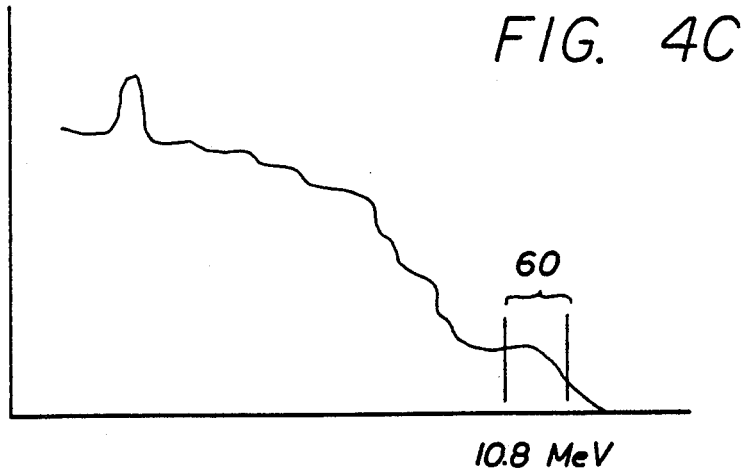

FIG. 4 illustrates in general the detection of the information by any one of the individual detectors 48. As shown in FIG. 4, neutrons from the sources, either 32 or 34, are thermalized and impinge on a piece of luggage or parcel as represented by the block 50. Each of the individual detectors 48 forming the C-ring detector structures detects the production of gamma rays. The reaction between the thermal neutrons and the nitrogen in the explosive or other material is as follows:

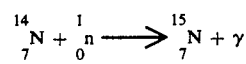

$$^{14}_{7}N + ^{1}_{0}n \longrightarrow ^{15}_{7}N + \gamma$$

The first factor in the above equation is the nitrogen in the explosive or other material within the luggage. For example, wool, cotton, etc. all contain nitrogen. The nitrogen when bombarded with thermal neutrons, as shown by the second factor, produces nitrogen in a changed form (another isotope of nitrogen) plus gamma rays, of which approximately 14% are at 10.8 MeV. Each gamma ray as detected by a detector 48 produces an output from the detector as shown in waveform (a) in FIG. 4. As can be seen, the detector 48 produces an output signal having a height "h" and with this signal decaying exponentially to zero value at approximately one micro second. The detectors 48 are supplied with a high voltage from a high voltage source 52. The height ch" and the area under the decaying signal are both proportional to the gamma ray energy.

The output from each detector 48 is passed directly or through a preamp and amplifier 54 to produce an output signal as shown in waveform (b) in FIG. 4. It can be seen that the individual gamma ray is converted from the exponentially decreasing signal to a pulse signal having a height "H" which is proportional to the area under the signal shown in waveform (a). It is to be appreciated that each gamma ray received by each detector 48 produces successive signals representing the concentration of nitrogen.

The output from the preamp/amplifier 54 is passed through an analog to digital (A to D) converter 56 to produce a digital number representing the height "H" of the waveform (b) of FIG. 4. It can be seen, therefore, that the outputs from the A to D converters 56 are a series of digital numbers representing the detection of gamma rays indicative of the concentration of nitrogen. A small range of the digital numbers corresponds to the gamma rays of interest. As more and more gamma rays are detected at each detector, the digital number from the A to D converters 56 at each point in time is counted. The counts of each digital number which occurs, which is proportional to the number of nitrogen gamma rays incident on the detector, are then coupled into a computer 58 for computation of a profile for each slice or plane of the object under observation and for the production of a three dimensional representation of the concentration of nitrogen of the object. Waveform (c) illustrates the profile of the spectrum received by the detectors 48 and with the space 60 between the two lines representing the area of interest, more specifically the gamma rays representing nitrogen.

FIGS. 5(a), (b) and (c) illustrate typical profiles for explosive material in a block form, non-explosive materials, such as a wool coat or jacket, and explosive material in sheet form. As can be seen in FIG. 5(a), which represents the detection from one column of detectors at four successive planes as the object moves past the dectectors, the high readings of 12 in two successive planes and 8 in a third successive plane represent a high concentration of nitrogen rich material probably representive of a block of explosive material. The detectors in the other column and along the row would confirm the presence of such block material. The large difference between readings in the profile of FIG. 5(a) show an unusual density of nitrogen material not typical in other types of items which contain nitrogen.

For example, FIG. 5(b) illustrates an item such as a wool coat or suit which may contain a relatively high amount of nitrogen, but with the nitrogen spread out in a diffuse pattern which would not be representative of an explosive material. Although the overall nitrogen content of the wool article is quite high, the concentration does not reach the levels of explosive material.

FIG. 5(c) illustrates an explosive material in a sheet form along one side or edge of the luggage and again, the concentration of nitrogen and high readings relative to the lower readings indicates the presence of something having a relative high concentration of nitrogen, plus a relatively high density for this concentration. This again would typically be a profile of an explosive material. The computer 58, therefore, may be programmed to identify such specific profiles and provide for an alarm such as through an alarm 62 so that the luggage or parcel may be subjected to a more thorough inspection.

The present invention is, therefore, directed to an explosive detection system using thermalized neutrons from a source to impinge on an object potentially containing explosive material and with the thermal neutrons reacting with the nitrogen contained in the object to produce gamma rays. The gamma rays are detected by inorganic scintillators and, in a preferred embodiment, the scintillators are arranged in a ring configuration to provide for a detection of a two dimensional slice or plane of the object under observation. The object is moved continuously through the ring of detectors so that successive slices or planes provide for the build up of a three dimensional profile of the nitrogen bearing material within the object under observation. The three dimensional profile may then be used to provide for a determination of the concentration and distribution of the nitrogen bearing material to make a determination whether such nitrogen bearing material has a profile likely to be an explosive material, such as high nitrogen density.

In a preferred embodiment, the inorganic scintillator is sodium iodide and with two oppositely disposed C-ring detectors having their open ends facing each other to provide for a complete profile of each slice or plane along all four sides. In addition, the detectors may be formed of sets of detectors in rows and columns to increase the detection capability by receiving additional gamma rays produced by the interaction of the thermal neutrons and nitrogen in the cavity. The present invention, therefore, provides for a greater resolution and efficiency in the detection of potentially explosive material and with this accomplished in a fast period of time so as to provide for an adequate throughput of the luggage or parcels through the detection system.

Although the invention has been described with reference to a particular embodiment, it is to be appreciated that various adaptations and modifications may be made and the invention is only to be limited by the appended claims.

We claim:

1. A system for detecting the presence of explosive in an object under observation by detection of a particular element, and the concentration of such particular, element, at the different positions in the object, including, a cavity structure for receiving the object under observation, means stationary in the cavity structure for providing thermal neutrons to the object under observation for interaction with the object under observation to obtain the production from the object of gamma rays representative of the presence and concentration of the particular element in the object, means for moving the object through the cavity structure, a plurality of inorganic detectors disposed in the cavity structure and operative independently of one another and positioned relative to the thermal neutron means and the object for detecting the gamma rays to produce output signals indicative at each instant of such gamma rays, the thermal neutron means and the inorganic detectors being disposed in a common planar relationship enclosing the object to obtain the detection by the inorganic detectors at each instant of the gamma rays in such common plane, the common planar relationship being transverse to the direction of movement of the object through the cavity structure, the inorganic detectors in the plurality being operative independently of one another, and means responsive to the output signals from the inorganic detectors at progressive instants of time in the common planar relationship during the movement of the object through the cavity structure for processing such signals to indicate the presence, and the concentration of the particular element, at the different positions in the object on a three-dimensional basis.

2. The system of claim 1, wherein the moving means includes a conveyor passing through the cavity structure and supporting the object under observation to move the object through the cavity structure and provide for detection of the presence, and the concentration on a three-dimensional basis, of the particular element at the different positions in successive planes of the object, the successive planes being substantially parallel to the common planar relationship.

3. The system of claim 2 wherein the object is a container and wherein the thermal neutron means are disposed relative to the container in the common planar relationship to direct the thermal neutrons into the container and wherein the inorganic detectors are disposed relative to the container in the common planar relationship for receiving the gamma rays emanating from the container, the common planar relationship being substantially perpendicular to the direction of movement of the object through the cavity structure.

4. The system of claim 1 wherein the inorganic detectors are formed from at least one of the following materials: Sodium Iodide (NaI), Cesium Iodide (CsI), Bismuth Germanate ($Bi_4Ge_3O_{12}$), Barium Floride ($BaF_2$), and solid-state detectors including Lithium-drifted Germanium (Ge(Li)), High Purity Germanium (HPGe), and Mercuric Iodide ($HgI_2$).

5. The system of claim 3 wherein the inorganic detectors are formed from Sodium Iodide (NaI).

6. The system of claim 1 wherein the inorganic detectors, operative independently of one another, are disposed as a plurality of individual detectors in a C-ring configuration, open at one end, in the common plane around the cavity structure and the thermal neutron means are disposed at the open end of the C-ring configuration in the common planar relationship to obtain the detection by the inorganic detectors of the presence of the particular element, and the concentration of the particular element at different positions, within the common planar relationship to produce output signals representing the presence of the particular element in the object in such common plane and wherein the processing means process the signals produced at successive instants by the inorganic detectors in such common planar relationship during the movement of the container through the cavity structure to indicate the presence, and the concentration at each position in the object on a three-dimensional basis, of the particular element in the object.

7. The system of claim 6, including, the inorganic detectors being positioned in the common planar relationship to detect the particular element within a plurality of successive planes through the object in accordance with the movement of the object past the common planar relationship to obtain a three dimensional representation by the processing means of the presence, and the concentration at each position in the object in the three dimensional representation, of the particular element in the object.

8. The system of claim 7 wherein the processing means include computer means responsive to the output signals from the inorganic detector means for producing an alarm condition in response to particular patterns of three dimensional concentrations of the particular element in the object.

9. The system of claim 6 wherein the plurality of individual detectors are disposed in the common planar relationship in a C-ring configuration, open at one end, with the thermal neutron means disposed in the common planar relationship in the open portion of the C-ring configuration.

10. The system of claim 6 wherein the plurality of individual detectors are formed in a pair of common planar relationships into a pair of C-ring configurations in which each C-ring configuration has an open end opposite the open end in the other C-ring configuration and in which the pair of C-ring configurations are spaced from each other in the direction of movement of the object and wherein the thermal neutron means are respectively disposed in the common planar relationships in the open ends of the C-ring configurations.

11. The system of claim 10 wherein the inorganic detectors are disposed relative to the moving object and the thermal neutron means to detect the particular element in a plurality of successive spaced planes through the object in accordance with the movement of the object through the cavity structure to obtain a three dimensional profile by the processing means of the presence, and the concentration at different positions on a three-dimensional basis, of the particular element in the object.

12. The system of claim 11 wherein the detectors in each of the C-ring configurations are disposed in oppositely positioned columns from the positioning of the detectors in the other C-ring configuration and each of the columns has parallel sets of the inorganic detectors.

13. A detection system for producing a three-dimensional profile of the concentration of a particular element at the different positions in an object, including a cavity structure for receiving the particular object within the cavity structure, the cavity structure being defined by top and bottom walls and a pair of side walls, stationary means for producing thermal neutrons within the cavity structure to interact with the object in forming gamma rays of a particular energy, a plurality of scintillator detectors disposed within the cavity structure in a common plane with the thermal neutron means and operative independently of one another to detect the gamma rays from the object of the particular energy, the plurality of detectors being disposed in an open C-ring configuration around the object to detect the concentration of the particularly element in the object in the common plane passing through the object and the thermal neutron means and the detectors during the movement of the object through the cavity structure, each detector producing output signals representative of the passage of the gamma rays from the object of the particular energy, the detectors being disposed adjacent the side walls and one of the top and bottom walls of the cavity structure, means for moving the object through the cavity structure, and means for processing the signals from the detectors to provide an indication of the concentration on a threedimensional basis of the particular element at the different positions in the object.

14. The system of claim 13 wherein the moving means includes a conveyer means passing through the cavity structure and supporting the object to move through the cavity structure and to provide for the detection of the presence and concentration of the particular element in successive planes of the object parallel to the common plane and to provide a three dimensional representation of the concentration of the particular element in the object at the different positions in the object.

15. The system of claim 14 wherein the object is a container and wherein means are provided for processing the output signals from the detectors to provide the three dimensional representation profile of the concentration of the particular element in the object at the different positions in the object and wherein the common plane is substantially perpendicular to the direction of movement of the object through the cavity structure.

16. The system of claim 14 additionally including computer means responsive to the output signals from the detectors for producing an alarm condition in response to particular three dimensional representations of the concentration of the particular element in the object at the different positions in the object and wherein the common plane is substantially perpendicular to the direction of movement of the object through the cavity structure.

17. The system of claim 16 wherein the scintillator detectors are composed of inorganic material.

18. The system of claim 17 wherein the inorganic detectors are formed from at least one of the following materials: Sodium Iodide (NaI), Cesium Iodide (CsI), Bismuth Germanate (BGO-$Bi_4Ge_3O_{12}$) and Barium Fluoride ($BaF_2$) and solid-state detectors including Lithium-drifted Germanium (Ge(Li)), High Purity Germanium (HPGe), and Mercuric Iodide ($HgI_2$).

19. The system of claim 13 wherein the inorganic detectors are formed from Sodium Iodide (NaI).

20. The system of claim 13 wherein the scintillator detectors are formed into a C-ring configuration, open at one end, and the thermal neutron means are disposed in the open end of the C-ring configuration.

21. The system of claim 13 wherein the plurality of scintillator detectors are a spaced pair of C-ring configurations, open at one end, having open ends opposite each other and separated from each other in the direction of movement of the object in the cavity structure and wherein the scintillator detectors in each of the ring configurations are in a common plane spaced from the scintillation detectors in the other C-ring configuration in the direction of movement of the object through the cavity structure.

22. The system of claim 21 additionally including means for integrating the output signals from the detectors to provide resultant signals and wherein the data processing means are operative upon the resultant signals to provide the three dimensional representation of the concentration of the particular element in the object at the different positions in the object.

23. The system of claim 21 wherein each of the spaced pair of open C-shaped ring configuration is defined by parallel sets of individual detectors.

24. The system of claim 10 wherein
side structures and top and bottom structures are disposed in the cavity structure and wherein the inorganic detectors in one of the C-ring configurations are disposed in three of the side and top and bottom structures in the cavity structure and wherein the inorganic detectors in the other C-ring configuration are disposed in three of the the top and bottom and side structures in the cavity structure and wherein the fourth one of the top and bottom and side structures in one of the open C-ring configurations is opposite the fourth one of the top and bottom and side structures in the other C-ring configuration and wherein the open C-ring configurations are substantially parallel to each other and substantially perpendicular to the direction of movement of the object through the cavity structure.

25. The system of claim 12 wherein
side structures and top and bottom structures are disposed in the cavity structure and wherein the inorganic detectors in one of the C-ring configurations are disposed in three of the top and bottom and side structures in the cavity structure and wherein the inorganic detectors in the other C-ring configuration are disposed in three of the top and bottom and side structures in the cavity structure and wherein the fourth one of the top and bottom and side structures in one of the C-ring configurations is opposite the fourth one of the top and bottom and side structures in the other C-ring configuration and wherein the open C-shaped configurations are substantially parallel to each other and substantially perpendicular to the direction of movement of the object through the cavity structure.

26. The system of claim 21 wherein
side structures and top and bottom structures are disposed in the cavity structure and wherein the scintillator detectors in one of the C-ring configurations are disposed in three of the top and bottom and side structures in the cavity structure and wherein the scintillator detectors in the other C-ring configuration are disposed in three of the top and bottom and side structures in the cavity structure and wherein the fourth one of the top and bottom and side structures in one of the open C-ring configurations is opposite to the fourth one of the top and bottom and side structures in the other open C-ring configuration and wherein the open C-ring configurations are substantially parallel to each other and substantially perpendicular to the direction of movement of the object through the cavity structure.

27. The system of claim 23 wherein
side structures and top and bottom structures are disposed in the cavity structure and wherein the scintillator detectors in one of the C-ring configurations are disposed in three of the top and bottom and side structures in the cavity structure and wherein the scintillator detectors in the other C-ring configuration are disposed in three of the top and bottom and side structure in the cavity structure and wherein the fourth one of the top and bottom and side structures in one of the open C-ring configurations is opposite to the fourth one of the top and bottom and side structures in the other open C-shaped configuration and wherein the open C-ring configurations are substantially parallel to each other and substantially perpendicular to the direction of movement of the object through the cavity structures.

28. A system for detecting the presence of explosives in an object under observation by detection of a particular element, and the three-dimensional concentration of such particular element, at the different positions in the object, including, a cavity structure for receiving the object under observation, means stationary in the cavity structure for providing thermal neutrons to the object under observation to obtain the production from the object of gamma rays representative of the presence and concentration of the particular element in the object, means for moving the object continuously and progressively through the cavity structure, a plurality of detector means operative independently of one another and disposed in the cavity structure and positioned relative to the thermal neutron means and the object for detecting the gamma rays from the object, during the movement of the object continuously and progressively through the cavity structure, to produce output signals indicative at each instant of such gamma rays, and the detector means and the stationary thermal neutron means being disposed in a common plane enclosing the object, means responsive to the output signals produced by the detector means at the progressive instants of time during the continuous and progressive movement of the object through the cavity structure for processing such output signals to indicate the presence, and the concentration on a three-dimensional basis, of the particular element at the different positions in the object.

29. A system as set forth in claim 28 wherein the detector means constitute inorganic detectors.

30. A system as set forth in claim 28 wherein the thermal neutron means are located at at least two progressive positions in the direction of the movement of the object through the cavity structure and wherein the detector means are located at at least two progressive positions in the direction of the movement of the object continuously and progressively through the cavity and wherein the detectors at each of the progressive positions detect the gamma rays passing from the object as a result of the thermal neutrons from the thermal neutron means at an individual one of the progressive positions.

31. A system as set forth in claim 30 wherein the detector means include inorganic detectors formed from at least one of the following materials: Sodium Iodide (NaI), Cesium Iodide (CeI), Bismuth Germanate ($Bi_4Ge_3O_{12}$), Barium Fluoride ($BaF_2$) and solid state detectors including Lithium-drifted Germanium (GeLi), High Purity Germanium (HPGe) and Mercuric Iodide ($HgI_2$).

32. A system for detecting the presence of explosives in an object under observation by detection of a particular element at the differnet positions in the object, including, a cavity structure for receiving the particular object within the cavity structure, stationary means for producing thermal neutrons within the cavity structure to interact with the object in forming gamma rays of a particular energy, means for providing a movement of the object continuously and progressively through the cavity structure, a plurality of detector means operative independently of one another and disposed within the cavity structure and positioned relative to the thermal neutron means for detecting the gamma rays from the object in progressive planes in the object, each progressive plane being transverse to the direction of movement of the object in the cavity structure, and for producing output signals representative of the gamma rays detected in each plane from the object, the detector means and the stationary thermal neutron means being disposed in a common plane enclosing the object, and means for processing the output signals produced in the detector means at the progressive instants of time during the continuous and progressive movement of the object through the cavity structure to provide an indication of the particular element at the different positions in the object on a three-dimensional basis.

33. A system as set forth in claim 32 wherein the thermal neutron means and the detector means are disposed relative to one another to provide for the detection by the detector means of the gamma rays passing from the object at all of the positions in the progressive planes and to produce output signals in accordance with such detection and wherein the processing means are operative to process the signals from the detector means for the progressive planes to provide an indication of the particular element at the different positions in the object and the three-dimensional concentration of such particular element at the different positions in the object.

34. A system as set forth in claim 32 wherein the detector means constitute inorganic detectors.

35. A system as set forth in claim 34 wherein the moving means includes conveyor means passing through the cavity structure and supporting the object to move the object through the cavity structure.

36. A system as set forth in claim 33 wherein the processing means includes means for producing an alarm condition in response to particular three-dimensional representations of the concentration of the particular element in the object at the different positions in the object.

37. A system as set forth in claim 33 wherein the progressive planes are substantially perpendicular to the direction of movement of the object in the cavity structure and wherein the detector means constitute inorganic detectors.

38. A system as set forth in claim 33 wherein means are included for integrating the output signals from the detector means and wherein the data processing means are operative upon the integrated output signals to provide the three-dimensional representation of the concentration of the particular element in the object at the different positions in the object.

39. The system of claim 6 wherein the C-ring configuration is defined by three abutting sides and wherein different groups of the individual detectors in the plurality are disposed in the three planar sides and wherein the individual detectors in each group are operative independently of one another and independently of the detectors in the other groups.

40. The system of claim 6 wherein each of the C-ring configurations is defined by three abutting sides and wherein different groups of the individual detectors in the plurality are disposed in the three planar sides and wherein the individual detectors in each group are operative independently of one another and independently of the other groups.

41. The system of claim 16 wherein the C-ring configuration is defined by three abutting sides and wherein different groups of the detectors in the plurality are disposed in the three planar sides and wherein the individual detectors in each group are operative independently of one another and independently of the detectors in the other groups.

42. The system of claim 22 wherein each of the C-ring configurations is defined by three abutting sides and wherein different groups of the individual detectors in the plurality are disposed in the three planar sides and wherein the individual detectors in each group are operative independently of one another and independently of the detectors in the other groups.

43. The system of claim 24 wherein an individual group of detectors is disposed in each of the structures defining the positions of each of the C-ring configurations and wherein the individual detectors in each group are operative independently of one another and independently of the detectors in the other groups.

44. The system of claim 25 wherein an individual group of detectors is disposed in each of the structures defining the positions of each of the C-ring configurations and wherein the detectors in each group are operative independently of one another and independently of the detectors in the other groups.

45. The system of claim 26 wherein an individual group of detectors is disposed in each of the structures defining the positions of each of the C-ring configurations and wherein the detectors in each group are operative independently of one another and independently of the detectors in the other groups.

46. The system of claim 27 wherein an individual group of detectors is disposed in each of the structures defining the positions of each of the C-ring configurations and wherein the detectors in each group are operative independently of one another and independently of the detectors in the other groups.

* * * * *

UNITED STATES PATENT AND TRADEMARK OFFICE
CERTIFICATE OF CORRECTION

PATENT NO. : 5,006,299

DATED : APRIL 9, 1991

INVENTOR(S) : TSAHI GOZANI and PATRICK M. SHEA

It is certified that error appears in the above-identified patent and that said Letters Patent is hereby corrected as shown below:

Column 10, line 40, after the period (.) insert as a separate paragraph:

--This invention was made with the support of the United States Government under contract DTFA03-85-C-00053 awarded by the Department of Transportation. The United States Government has certain rights in this invention.--

Signed and Sealed this

Fifteenth Day of December, 1992

Attest:

DOUGLAS B. COMER

Attesting Officer

Acting Commissioner of Patents and Trademarks